(12) United States Patent
Otsuki (10) Patent No.: US 8,577,421 B2
(45) Date of Patent: Nov. 5, 2013

(54) MOBILE TERMINAL, CONTROL METHOD OF MOBILE TERMINAL, AND RECORDING MEDIUM

(75) Inventor: Michihito Otsuki, Tokyo (JP)

(73) Assignee: NEC Corporation, Tokyo (JP)

(*) Notice: Subject to any disclaimer, the term of this patent is extended or adjusted under 35 U.S.C. 154(b) by 249 days.

(21) Appl. No.: 13/058,670

(22) PCT Filed: Aug. 20, 2009

(86) PCT No.: PCT/JP2009/003999
§ 371 (c)(1),
(2), (4) Date: Feb. 11, 2011

(87) PCT Pub. No.: WO2010/041369
PCT Pub. Date: Apr. 15, 2010

(65) Prior Publication Data
US 2011/0136546 A1    Jun. 9, 2011

(30) Foreign Application Priority Data

Oct. 10, 2008  (JP) .................................. 2008264202

(51) Int. Cl.
*H04M 1/00* (2006.01)
(52) U.S. Cl.
USPC ........ 455/566; 455/149; 455/350; 455/575.1; 455/575.4; 455/575.7
(58) Field of Classification Search
USPC ......... 455/575.1, 575.4, 575.7, 566, 149, 350
See application file for complete search history.

(56) References Cited

U.S. PATENT DOCUMENTS

| 4,944,002 | A | * | 7/1990 | Bader ...................... 379/395.01 |
| 5,319,799 | A | * | 6/1994 | Morita ............................ 455/78 |
| 2005/0250532 | A1 | * | 11/2005 | Hwang et al. .............. 455/550.1 |
| 2005/0266898 | A1 | * | 12/2005 | Ahn et al. ................... 455/575.1 |
| 2007/0265031 | A1 | * | 11/2007 | Koizumi et al. ........... 455/556.1 |
| 2008/0045279 | A1 | * | 2/2008 | Ohki .......................... 455/575.1 |
| 2008/0084659 | A1 | * | 4/2008 | Misawa ....................... 361/681 |
| 2008/0214243 | A1 | * | 9/2008 | Forrester ................... 455/562.1 |

FOREIGN PATENT DOCUMENTS

| EP | 1 124 175 A2 | 8/2001 |
| EP | 1124175 | * 8/2001 |
| EP | 1 798 939 A1 | 6/2007 |
| JP | 5-153201 A | 6/1993 |
| JP | 2005136457 A | 5/2005 |
| JP | 2006042077 A | 2/2006 |
| JP | 2008092176 A | 4/2008 |
| JP | 2008141615 A | 6/2008 |

OTHER PUBLICATIONS

International Search Report for PCT/JP2009/003999 mailed Oct. 6, 2009.
The Extended European Search Report for EP 09 81 8909.5 dated on Mar. 28, 2013.

* cited by examiner

*Primary Examiner* — Wayne Cai
*Assistant Examiner* — Shantell L Heiber (57) ABSTRACT

To provide a mobile terminal capable of achieving the optimal volume according to a style without causing discomfort to the user. A mobile terminal in accordance with the present invention includes a main body including a microphone 219, a screen display unit including speaker-and-receiver units 226 and 227 at both ends thereof, the screen display unit being disposed in the main body in such a manner that the screen display unit can slide and rotate with respect to the main body, and switches 224 and 225 that select the speaker or the receiver to be used in respective speaker-and-receiver units according to a style formed by the screen display unit and the main body.

9 Claims, 7 Drawing Sheets

Fig. 1

| No | STYLE | USAGE STATE | WHEN RECEIVER IS USED, SUCH AS VOICE CALL | WHEN SPEAKER IS USED, SUCH AS MUSIC PLAYBACK | WHEN SOUND IS PRODUCED FROM SPEAKER WHILE USER HOLDS TERMINAL NEAR EAR, SUCH AS WHEN RINGTONE IS RINGING (INCLUDING IMMEDIATELY AFTER TERMINATION OF CALL) |
|---|---|---|---|---|---|
| 1 | STYLE 1 (227, 226, 219) | | Rch-SIDE SPEAKER-AND-RECEIVER UNIT 227 IS USED AS RECEIVER | Lch-SIDE AND Rch-SIDE SPEAKER-AND-RECEIVER UNITS 226 AND 227 ARE BOTH USED AS SPEAKERS | ONLY Lch-SIDE SPEAKER-AND-RECEIVER UNIT 226 IS USED AS SPEAKER (VOLUME IS NOT LARGER THAN 2) |
| 2 | STYLE 2 (226, 227, 219) | | CALL IS NOT SUPPORTED AMPLIFIER 3 IS SUSPENDED (MUTE) (MICROPHONE IS ALSO PUT INTO MUTE STATE) | Lch-SIDE AND Rch-SIDE SPEAKER-AND-RECEIVER UNITS 226 AND 227 ARE BOTH USED AS SPEAKERS | THIS STATE DOES NOT EXIST BECAUSE SPEAKER-AND-RECEIVER UNIT IS NOT USED AS RECEIVER IN THIS STYLE |
| 3 | STYLE 3 (227, 227 226 219, 226, 219) | | Lch-SIDE SPEAKER-AND-RECEIVER UNIT 226 IS USED AS RECEIVER | Lch-SIDE AND Rch-SIDE SPEAKER-AND-RECEIVER UNITS 226 AND 227 ARE BOTH USED IN REVERSED STATE | ONLY Rch-SIDE SPEAKER-AND-RECEIVER UNIT 227 IS USED AS SPEAKER (VOLUME IS NOT LARGER THAN 2) |

MOBILE TERMINAL, CONTROL METHOD OF MOBILE TERMINAL, AND RECORDING MEDIUM

This application is the National Phase of PCT/JP20091003999, filed Aug. 20, 2009, which is based upon and claims the benefit of priority from Japanese patent application No. 2008-264202, filed on Oct. 10, 2008, the disclosure of which is incorporated herein in its entirety by reference.

TECHNICAL FIELD

The present invention relates to a mobile terminal, a control method of a mobile terminal aid a recording medium.

BACKGROUND ART

In recent years, mobile terminals such as mobile phones are equipped with advanced functions such as a function of receiving "One-Seg" (one-segment television) broadcasting. As a result, mobile terminals having such a complicated shape that they can be used with the screen being in a landscape position in addition to in the conventional portrait position have come into use. In such mobile terminals, the restrictions on the positional relation between the speaker and the receiver have become stricter. As a result, mobile terminals in which receivers are disposed in a plurality of places as well as mobile terminals in which the receiver and the speaker are disposed adjacent to each other so that they are shared to achieve the miniaturization have come onto the market.

As for the mobile terminals in which the receiver and the speaker are disposed adjacent to each other among these mobile terminals, there are folding-type mobile communication terminals in which consideration is given to lessening the discomfort to users (for example, see Patent literature 1). The invention disclosed in Patent literature 1 relates to a mobile communication terminal. This mobile communication terminal includes a receiver for a telephone call, a speaker for producing a ringtone, means for setting the volume of a ringtone, means for determining the volume of a ringtone, means for processing a ringtone, and means for detecting the opening/closing of folding housings. The receiver for a telephone call is disposed in one housing of the folding housings. The speaker for producing a ringtone is disposed adjacent to the receiver for a telephone call. The means for setting the volume of a ringtone sets the volume of a ringtone according to user setting. The means for determining the volume of a ringtone determines the volume of a ringtone according to the set volume of a ringtone. The means for processing a ringtone processes the volume of a ringtone to be produced from the speaker for producing a ringtone based on an adjusted volume. The means for determining the volume of a ringtone determines the adjusted volume according to the detection result of the opening/closing detection means.

It is stated in Patent literature 1 that since the amplification process is performed so as to obtain only the volume specified by the adjusted volume, the necessary amount of the consumed power is small. Patent literatures 2 and 3 also disclose techniques related to that disclosed in Patent literature 1. The invention disclosed in Patent literature 2 relates to a mobile device. This mobile device includes a first housing including a first operation unit, a second housing including a display unit, a third housing, and a connection mechanism to connect the first, second, and third housings to each other. The connection mechanism connects the housings in such a manner that second housing can freely move from a first position at which the silhouette of the second housing conforms to that of the first housing to a second position and to a third position. Further, the connection mechanism connects the housings in an integrated fashion so that the silhouette of the second housing conforms to those of the first and third housings in the first position. Further, the connection mechanism connects the housings in such a manner that when the second housing is moved from the first position to the second position, it restricts the movement of the third housing such that the amount of the movement of the third housing resulting from the movement of the second housing is zero or smaller than that of the second housing so that the third housing is exposed. Further, when the second housing is moved from the first position to the third position, it restricts the movement of the third housing such that the amount of the movement of the third housing resulting from the movement of the second housing is equal to or smaller than that of the second housing so that the first operation unit is exposed and thereby brought into an operable state.

It is stated in Patent literature 2 that when the display of the mobile device is in the portrait position, an operation member suitable for the portrait position is exposed, whereas when the display is in the landscape position, an operation member suitable for the landscape position is exposed. As a result, it is possible to provide the mobile device that can be easily operated by a user.

The invention disclosed in Patent literature 3 relates to a method of controlling the ringtone volume of a mobile phone. In this ringtone volume control method for a mobile phone, it is determined whether the number of ringtones is greater or smaller than a set number. Then, when the number of ringtones is smaller than or equal to the set number, the volume of a ringtone is set to a fixed value, whereas when the number of ringtones is greater than the set number, the volume of a ringtone is set to an arbitrary variable value.

According to the invention disclosed in Patent literature 3, when the number of ringtones detected by ringtone detection means is smaller than or equal to the set number, a ringtone having a predetermined comparatively small volume is produced, whereas when the detected number of ringtones exceeds the set number, a ringtone having a comparatively large volume that is set in advance by a user is produced. Accordingly, when the mobile phone receives an incoming call in a state where the user puts the mobile phone near his/her ear, the user can perceive the incoming call by a comparatively small ringtone, thereby preventing the damage to the ear. On the other hand, it is stated in Patent literature 3 that when the mobile phone detects an incoming call in a noisy place such as on the street, the user can perceive the incoming call in a shorter time than when an incoming call is received by using a conventional ringtone volume control method for a mobile phone because the ringtone is comparatively large after the set number of ringtones.

In addition to these mobile terminals, other mobile terminals including a mobile terminal in which the volume of the speaker at the time of receiving an incoming call is reduced in the opened state and a mobile terminal in which a vibration is used instead of the ringtone have been also proposed.

Note that in a folding-type mobile terminal, the opened state can be regarded as the used state. However, in the case of an integral-type mobile terminal, the user cannot determine that the mobile terminal is in an unused state by using the method like this. That is, the above-described method cannot be simply applied. Therefore, as for the integral-type mobile terminal, mobile terminals in which the volume is reduced for a predetermined period have come onto the market.

CITATION LIST

Patent Literature

Japanese Unexamined Patent Application Publication No. 2006-042077
Japanese Unexamined Patent Application Publication No. 2008-141615
Japanese Unexamined Patent Application Publication No. H05-153201

SUMMARY OF INVENTION

Technical Problem

Figure 6A:
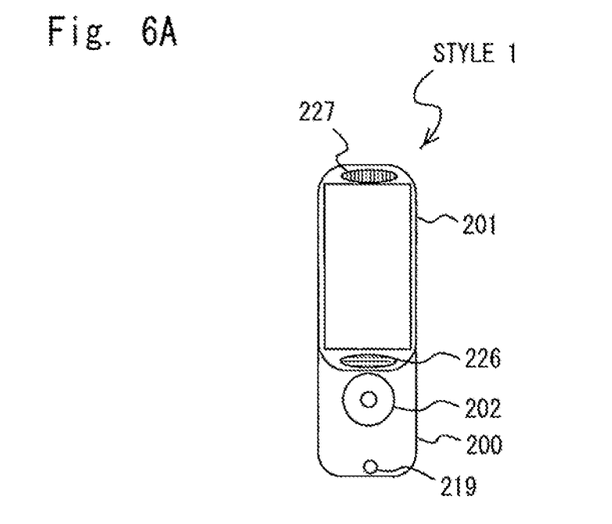
FIG. 6A is an explanatory diagram showing a style of a mobile terminal relating to the present invention in which both speaker-and-receiver units 226 and 227 and a microphone 219 are arranged on the same line with the maximum distance therebetween.
Figure 6B:
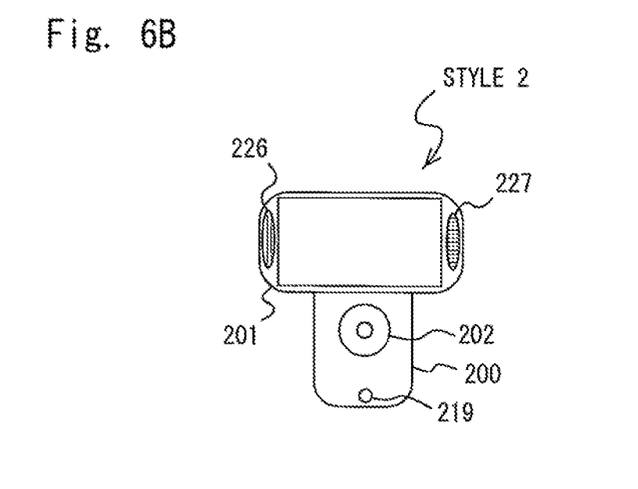
FIG. 6B is an explanatory diagram showing a style of a mobile terminal relating to the present invention in which a screen display unit 201 is disposed perpendicularly to a main body 200.
Figure 6C:
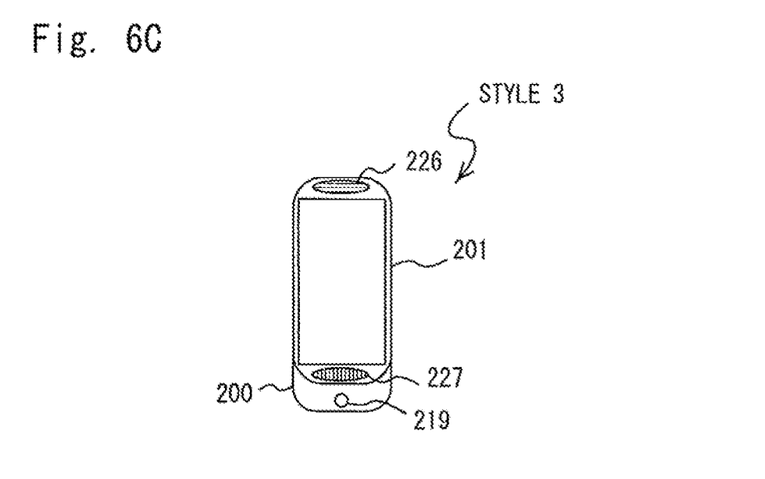
FIG. 6C is an explanatory diagram showing a style of a mobile terminal relating to the present invention in which both speaker-and-receiver units 226 and 227 and a microphone 219 are arranged on the same line with the minimum distance therebetween.
Figure 6D:
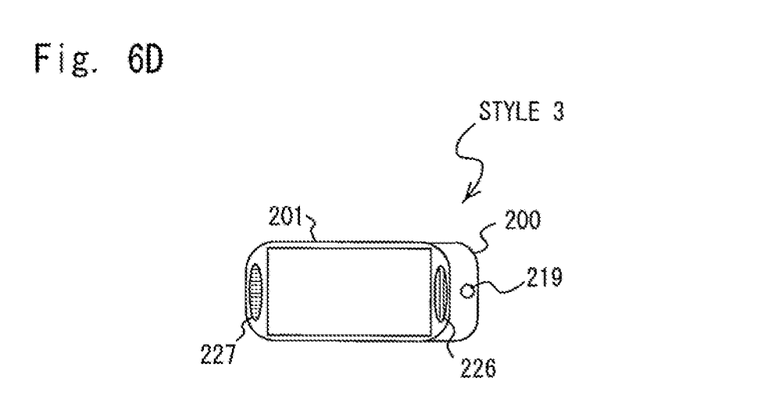
FIG. 6D is an explanatory diagram showing a style of a mobile terminal relating to the present invention in which both speaker-and-receiver units 226 and 227 and a microphone 219 are arranged on the same line with the minimum distance therebetween.

FIGS. 6A to 6D are explanatory diagrams showing styles of a mobile terminal relating to the present invention in which a screen display unit 201 can rotate and slide with respect to a main body 200 having a microphone 219. FIG. 6A shows Style 1 in which the microphone 219 and both speaker-and-receiver units 226 and 227 are arranged on the same line with the maximum distance therebetween, and FIG. 6B shows Style 2 in which the screen display unit 201 is disposed perpendicularly to the main body 200. Further, FIGS. 6C and 6D show Style 3 in which the microphone 219 and both the speaker-and-receiver units 226 and 227 are arranged on the same line with the minimum distance therebetween.

In each of Styles 1 to 3 shown in FIGS. 6A to 6D, a plurality of speaker-and-receiver units 226 and 227, in each of which one sound-producing means is used as both a receiver and a speaker, are used. Further, it is possible to set the speaker-and-receiver units 226 and 227 so that they produce a sound as a receiver or produce a sound as a speaker. The transfer state of a sound according to such setting is hereinafter referred to as "sound path".

In contrast to the folding style, the receiver can be always used in Styles 1 to 3 shown in FIGS. 6A to 6D. As a result, there is a problem that if the volume of the speaker is simply restricted, an incoming call could not be reliably conveyed to the user.

Further, since the position of the receiver is changed among Styles 1 to 3 shown in FIGS. 6A to 6D, there is a possibility that the user could recognize a wrong speaker-and-receiver unit as the receiver. Therefore, there has been a problem that, for example, even if the ringtone volume is restricted, there is an unsolved concern that the sound could be excessively loud to the user and thus causing discomfort to the user, depending on the setting of the sound path, under the condition that the user uses the receiver while producing a sound from the speaker.

That is, there are the following problems in Styles 1 to 3 shown in FIGS. 6A to 6D. A first problem is that when receivers are disposed in a plurality of places, a user could recognize a wrong speaker-and-receiver unit as the receiver, and that when a sound is produced from the speaker under the above-described condition, a sound having a large volume could be produced near user's ear and thus causing discomfort to the user.

A second problem is that if a sound is produced from the speaker immediately after the user has finished using the receiver, discomfort is also caused to the user as in the case of the previous problem.

A third problem is that if the volume of the speaker is adjusted so that no discomfort is caused to the user in the above-described state, it causes a restricted state where the sound cannot be produced with a sufficient volume when the user uses the speaker-and-receiver unit as a speaker.

Accordingly, an object of the present invention is to provide a mobile terminal capable of achieving the optimal volume according to the style without causing discomfort to the user, a control method of a mobile terminal, and a recording medium.

Solution to Problem

A mobile terminal in accordance with a first aspect of the present invention includes: a main body including a microphone; and a screen display unit including speaker-and-receiver units at both ends thereof the screen display unit being disposed in the main body in such a manner that the screen display unit can slide and rotate with respect to the main body, wherein the mobile terminal is configured to control each of the speaker-and-receiver units according to a style formed by the screen display unit and the main body.

A control method of a mobile terminal in accordance with a second aspect of the present invention is a method of controlling a mobile terminal including a main body including a microphone, and a screen display unit including speaker-and-receiver units at both ends thereof, the screen display unit being disposed in the main body in such a manner that the screen display unit can slide and rotate with respect to the main body, the control method including controlling each of the speaker-and-receiver units according to a style formed by the screen display unit and the main body.

A recording medium in accordance with a third aspect of the present invention stores a program that causes a computer to execute a step of controlling each of speaker-and-receiver units according to a style formed by a screen display unit and a main body, the main body including a microphone, the screen display unit including the speaker-and-receiver units at both ends thereof, and the screen display unit being disposed in the main body in such a manner that the screen display unit can slide and rotate with respect to the main body.

Advantageous Effects of Invention

In accordance with the present invention, it is possible to provide a mobile terminal capable of achieving the optimal volume according to the style without causing discomfort to the user, a control method of a mobile terminal, and a recording medium.

DESCRIPTION OF EMBODIMENTS

<Features>

This exemplary embodiment relates to a mobile terminal including a main body including a microphone, and a screen display unit including speaker-and-receiver units at both ends thereof. The screen display unit is disposed in the main body in such a manner that the screen display unit can slide and rotate with respect to the main body. That is, in a mobile communication terminal capable of implementing two states of the screen display including a portrait state and a landscape state by rotating and/or sliding the main body and the housing of the screen display unit, the mobile communication terminal has a such structure that a speaker for producing a ringtone and a receiver for a telephone call, are disposed adjacent to each other or are constructed from the same component, and when a sound such as a ringtone is produced from the speaker, achieves such volume control that no discomfort is caused to user's ear by giving consideration to a possibility that the user might be using the receiver.

In particular, in mobile terminals having three types of styles, when a receiver is used, the volume of a speaker that is not disposed adjacent to the receiver can be also restricted in order to prevent auditory discomfort caused by a loud sound produced from the speaker. Further, depending on the shape of the mobile terminal, it is also possible to impose restrictions on the usage of the receiver and/or to cancel the volume control by a user operation.

Next, an exemplary embodiment of a mobile terminal in accordance with the present invention is explained with reference to the drawings.

<Configuration>

Figure 1:
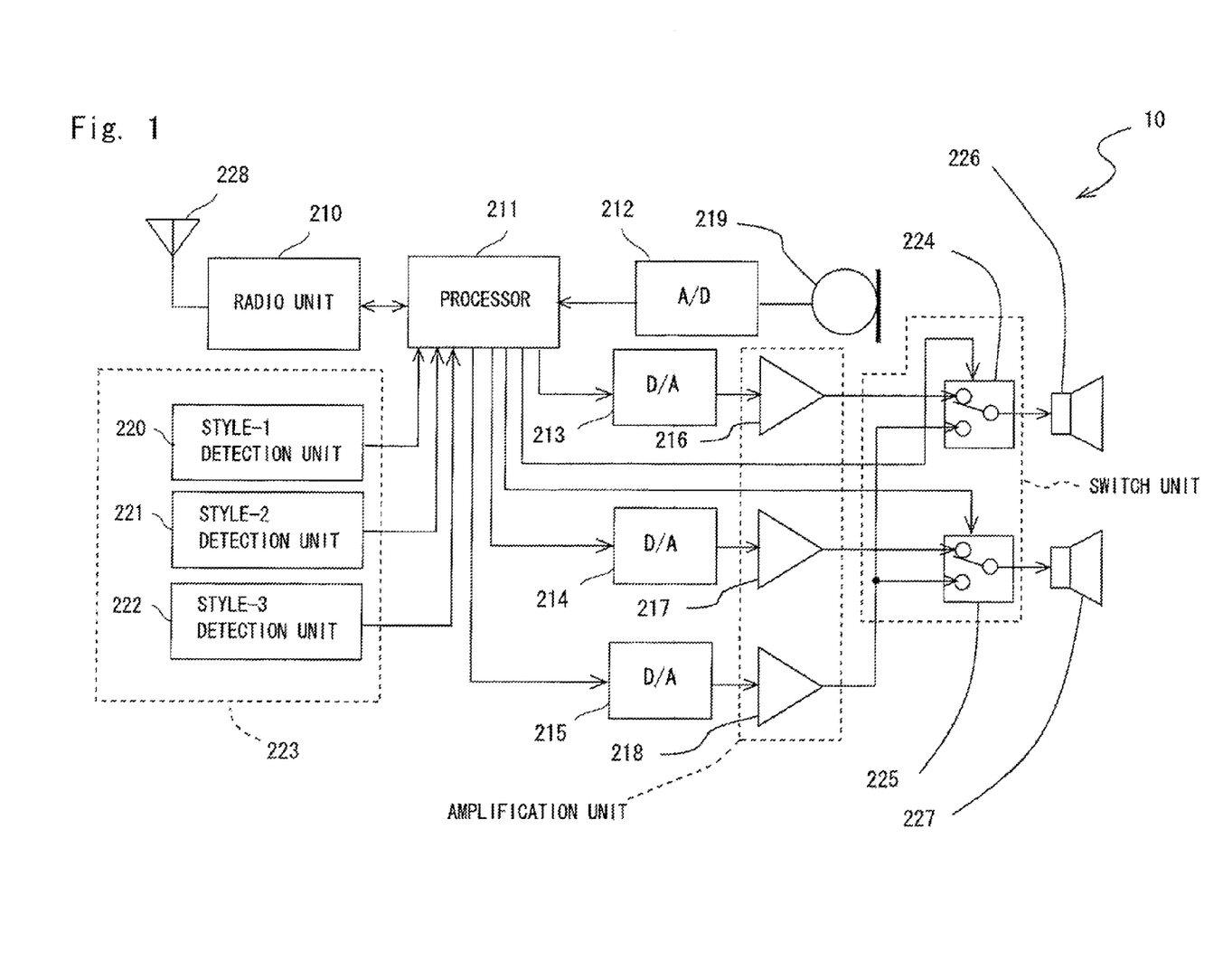
FIG. 1 is an example of a block diagram showing a substantial part of a circuit configuration of a mobile terminal in accordance with the present invention.

FIG. 1 is an example of a block diagram showing a substantial part of a circuit configuration of a mobile terminal in accordance with the present invention.

A mobile terminal 10 includes an antenna 228, a radio unit 210, a processor 211, a microphone 219, an A/D (Analog-Digital) conversion unit 212, D/A (Digital-Analog) conversion units 213 to 215, amplifiers 216 to 218, switches 224 and 225, speaker-and-receiver units 226 and 227, and a style detection circuit 223. Note that although no camera is illustrated, the mobile terminal may include a digital camera to take a picture of a subject. Further, if the mobile terminal implements a video telephone call it may also include a digital camera to take a picture of a user itself.

Among the amplifiers 216 to 218, which serve as amplification units, the amplifier 216 serving as a first amplification unit and the amplifier 217 serving as a second amplification unit serve as amplifiers to amplify a signal of music downloaded through a network, (analog) radio broadcasting, digital radio broadcasting, One-Seg television broadcasting, terrestrial digital broadcasting, or an alarm sound.

The amplifier 218 serving as a third amplification unit serves as an amplifier to amplify a voice telephone call signal.

The switch 224, which serves as a switch unit, serves as a switch to select a connection between the speaker-and-receiver unit 226 and the amplifier 216 or a connection between the speaker-and-receiver unit 226 and the amplifier 218 according to a control signal from the processor 211. For example, the switch 224 is composed of two CMOS (Complementary Metal-Oxide Semiconductor) analog switches whose drains or sources are connected to each other.

The switch 225, which serves as a switch unit, serves as a switch to select a connection between the speaker-and-receiver unit 227 and the amplifier 217 or a connection between the speaker-and-receiver unit 227 and the amplifier 218 according to a control signal from the processor 211. For example, the switch 225 is composed of two analog switches.

The style detection circuit 223, which serves as a style detection unit, includes a Style-1 detection circuit 220, a Style-2 detection circuit 221, and a Style-3 detection circuit 222.

The mobile terminal 10 has three types of styles, i.e., Styles 1 to 3, and these Styles 1 to 3 are detected by the Style-1 detection circuit 220, Style-2 detection circuit 221, and Style-3 detection circuit 222 respectively.

The only requirement for the Style-1 detection circuit 220 to Style-3 detection circuit 222 is to detect which position the screen display unit 201 is disposed in with respect to the main body 200. For example, the position can be detected by using a permanent magnet and a plurality of Hall elements. That is, in FIGS. 4A to 4D, a permanent magnet may be disposed at a position indicated by a wavy line 203 inside the screen display unit 201, and Hall elements may be disposed at; positions indicated by wavy lines 204 to 206 inside the main body 200. Then, it is possible to determine which of Styles 1 to 3 the screen display unit 201 is disposed in by detecting changes in the magnetic fields with the respective Hall elements.

FIGS. 4A to 4D are explanatory diagrams showing the styles of the mobile terminal in which the screen display unit 201 can rotate and slide with respect to the main body 200 including the microphone 219 shown in FIG. 1.

The processor 211 determines whether each of the speaker-and-receiver units 226 and 227 is used as a speaker or a receiver according to a detection result of each of the style detection circuits 220 to 222. After the determination according to each of the style detection circuits 220 to 222, the digital sound signal output from the processor 211 is converted into an analog signal by the D/A conversion units 213, 214 and 215. After the D/A conversion, the sound signal is amplified by the amplifiers 216, 217 and 218. The amplified sound signal is used to control the switches 224 and 225 so that a sound is produced from the speaker-and-receiver units 226 and 227 with a volume of a desired mode.

Note that the difference between the speaker and the receiver is that when the speaker-and-receiver unit is held against user's ear, it serves as the receiver, whereas when the speaker-and-receiver unit is not held against near the ear, it serves as the speaker. Specifically, when the speaker-and-receiver unit is to be held against user's ear, a sound from the other end of the telephone call is output from the receiver. When the speaker-and-receiver unit is not held against the ear, a sound such as music is output from the speaker. Further, in general, the maximum volume of a sound that is output through the receiver is set to a smaller value than that of a sound output through the speaker.

The other components of the mobile terminal 10 such as the microphone 219, the A/D conversion unit 212, the radio unit 210, and the antenna 228 are well known to those skilled in the art and are not directly related to the present invention, and therefore the explanation of their detailed configurations is omitted.

<Operation>

Next, a volume control method used in a mobile terminal in accordance with this exemplary embodiment is explained with reference to the drawings.

As shown in FIGS. 4A to 4D, the mobile terminal has three types of styles, i.e. Styles 1 to 3. Then, which style the mobile terminal is disposed in is determined by the Style-1 detection circuit 220, Style-2 detection circuit 221, and Style-3 detection circuit 222.

As conditions for producing a sound from the speaker-and-receiver unit 226 (hereinafter called "Lch-side speaker-and-receiver unit 226") and/or the speaker-and-receiver unit 227 (hereinafter called "Rch-side speaker-and-receiver unit 227"), the mobile terminal 10 shown in FIG. 1 has three types of conditions including not only the two types of simple conditions including (1) a case of using as a receiver and (2) a case of using as a speaker, but also (3) a case of using as a speaker while a ringtone is ringing. The condition (3) is used as a condition for a case where there is a possibility that the user is holding the mobile terminal near his/her ear. For each condition, whether the speaker-and-receiver unit is used as a receiver or a speaker, or is used as neither of them is determined according to the style and based on conditions shown in FIG. 2.

Figure 2:
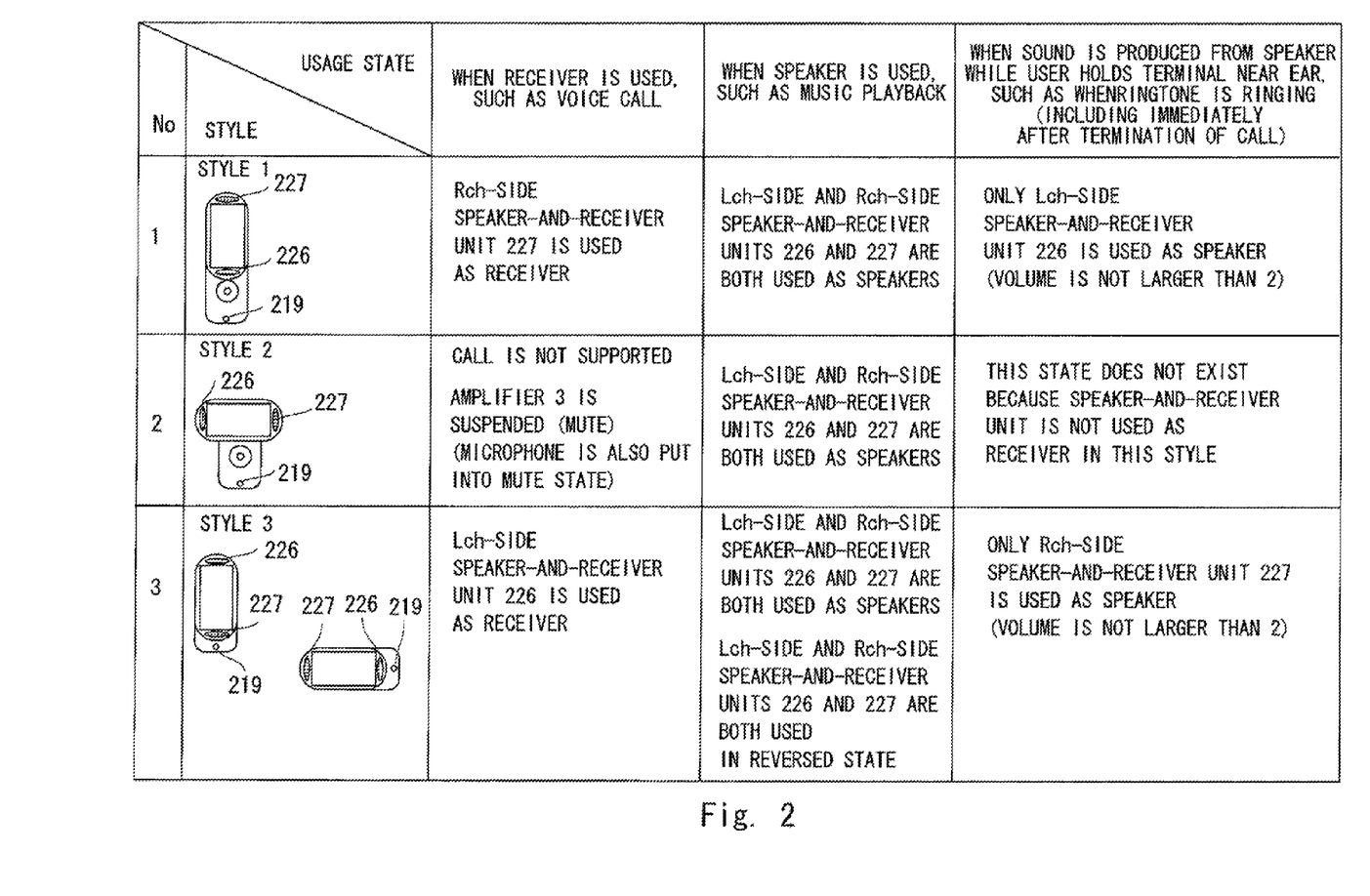
FIG. 2 is an example of table data used to perform volume control of a mobile terminal shown in FIG. 1.
Figure 5:
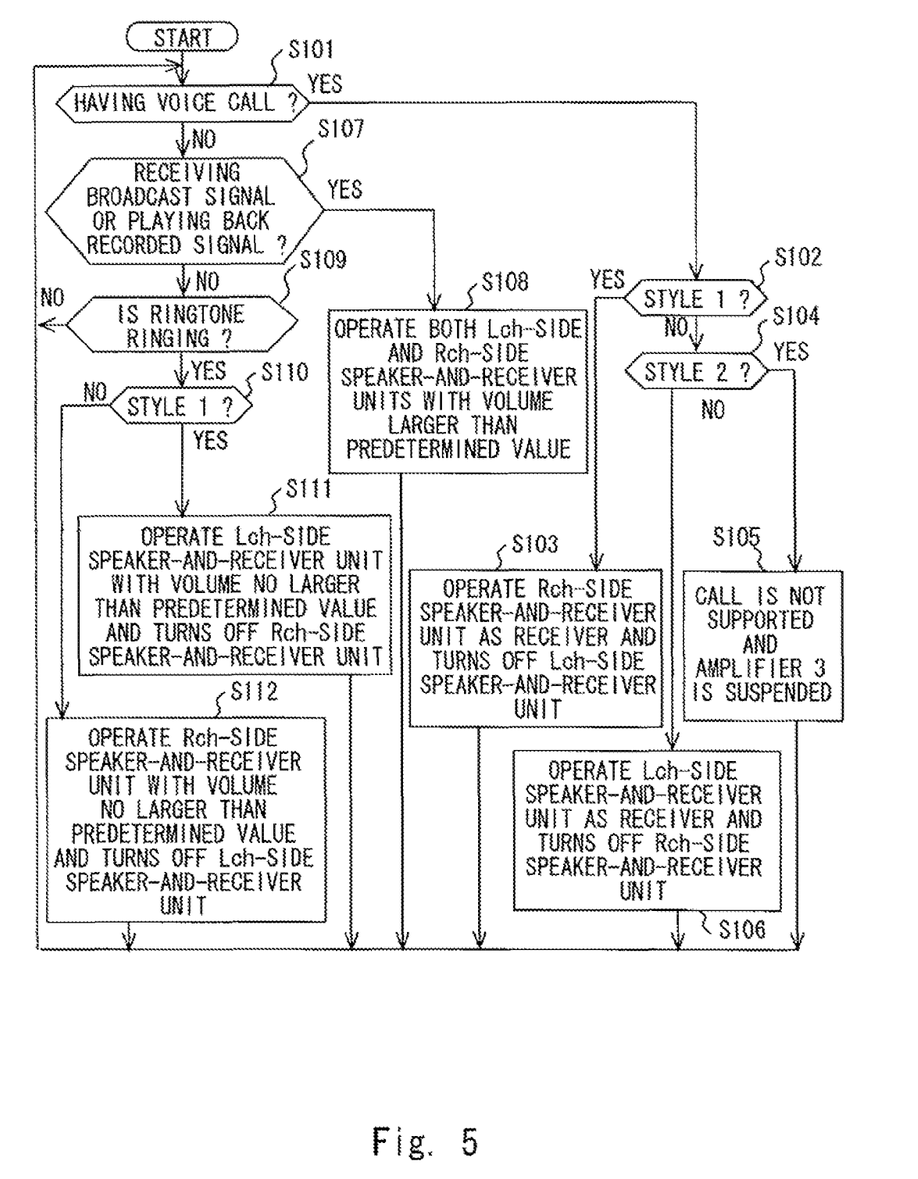
FIG. 5 is another example of a flowchart for explaining an operation of a mobile terminal in accordance with the present invention.

FIG. 2 is an example of table data used to perform volume control of the mobile terminal shown in FIG. 5.

The mobile terminal 10 controls the volume (including On/Off) of each speaker-and-receiver unit based on conditions shown in FIG. 2.

In FIG. 2, the relations between Styles 1 to 3 and a case where a receiver is used such as during a voice telephone call, a case where a speaker is used such as during music playback, and a case where while a ringtone is ringing and the user is holding the mobile terminal near his/her ear, a sound is produced from a speaker.

In FIG. 2, the term "SUCH AS VOICE CALL" means a conventional telephone call and a video telephone call. The term "SUCH AS MUSIC PLAYBACK" means to play back music downloaded through a network, (analog) radio broadcasting, digital radio broadcasting, One-Seg television broadcasting, terrestrial digital broadcasting, and an alarm sound. The term "VOLUME IS NOT LARGER THAN 2" means a volume value that is set so as to prevent discomfort to the user due to an excessively loud sound on the assumption that the mobile terminal is located close to user's ear. For example, the value is 30 dB.

During a voice telephone call, in the case of Style 1 in which both the speaker-and-receiver units 226 and 227 and the microphone 219 are arranged on the same line with the maximum distance therebetween, the processor 211, which serves as a control unit, switches the switches 224 and 225 so that the Rch-side speaker-and-receiver unit 227, which is farther from the microphone 219, is operated as a receiver. Further, the processor 211 puts the amplifiers 216 and 217 into a non-operated state so that the Lch-side speaker-and-receiver unit 226 is turned off.

In the case of Style 2 in which the screen display unit 201 is disposed perpendicularly to the main body 200, the processor 211 puts the amplifier 218 and the microphone 219 into a non-operated state.

In the case of Style 3 in which both the speaker-and-receiver units 226 and 227 and the microphone 219 are arranged on the same line with the minimum distance therebetween, the processor 211 switches the switches 224 and 225 so that the Lch-side speaker-and-receiver unit 226, which is farther from the microphone 219, is operated as a receiver and puts the amplifiers 216 and 217 into a non-operated state so that the Rch-side speaker-and-receiver unit 227 is turned off.

Further, while receiving a broadcast signal or playing back a recorded signal, in Style 1 in which both the speaker-and-receiver units 226 and 227 and the microphone 219 are arranged on the same line with the maximum distance therebetween, Style 2 in which the screen display unit 201 is disposed perpendicularly to the main body 200, and Style 3 in which both the speaker-and-receiver units 226 and 227 and the microphone 219 are arranged on the same Sine with the minimum distance therebetween, the processor 211 switches the switches 224 and 225 so that both the speaker-and-receiver units 226 and 227 are operated as speakers, puts the amplifiers 216 and 217 into operation, and puts the amplifier 218 into a non-operated state.

Note that the term "recorded signal" means downloaded music, pre-recorded alarm sounds, and sound effects.

Further, when a ringtone is ringing, in the case of Style 1 in which both the speaker-and-receiver units 226 and 227 and the microphone 219 are arranged on the same line with the maximum distance therebetween, the processor 211 operates the Lch-side speaker-and-receiver unit 226, which is closer to the microphone 219, as a speaker, switches the switches 224 and 225 so that the Rch-side speaker-and-receiver unit 227 is turned off, puts the amplifiers 216 and 217 into a non-operated state, and adjusts the output of the amplifier 218 to or below a predetermined value (volume 2).

In the case of Style 3 in which both the speaker-and-receiver units 226 and 227 and the microphone 219 are arranged on the same line with the minimum distance therebetween, the processor 211 operates the Rch-side speaker-and-receiver unit 227, which is closer to the microphone 219, as a speaker, switches the switches 224 and 225 so that the Lch-side speaker-and-receiver unit 226 is turned off, puts the amplifiers 216 and 217 into a non-operated state, and adjusts the output of the amplifier 218 to or below the predetermined value (volume 2).

Further, in this exemplary embodiment, as shown in FIG. 2, even when the speaker-and-receiver units 226 and 227 are used as speakers, the volume of the speaker on the opposite side to the receiver is also restricted in the condition (3) where there is a possibility that the user is holding the mobile terminal near his/her ear. As a result, it is possible to prevent discomfort to the user due to a large volume regardless of where user's ear is located.

Further, in this exemplary embodiment, the period in which a ringtone is ringing immediately after a telephone call has finished is used as the condition (3) where there is a possibility that the user is holding the mobile terminal near his/her ear. However, since the volume is equal to or less than two even when the situation where the user uses other functions such as music playback immediately after a telephone call has finished is used as the transition condition, there is a possibility that restrictions could be imposed for the user. However, it is possible to display a message such as "volume is being restricted" on the screen to urge the user to operate buttons, and thereby to determine that user's ear is not located near the speaker based on the operation of buttons. Therefore, it can be used as a transition condition to the condition (2) where the speaker-and-receiver unit is used as a speaker. In this way, in the state where the user is certainly holding the mobile terminal away from his/her ears, it is possible to provide a similar sense of use to that of conventional mobile terminals.

By providing a restriction in the condition where the speaker-and-receiver unit can be used as a receiver according to the style. It is possible to reduce the possibility that the receiver produces a loud sound near the ear. Further, in a situation where user's ear is presumed to be located near the receiver such as immediately after a telephone call, the speaker adjacent to the receiver is prevented from producing a sound, in addition, the volume of the speaker farther from the receiver is also restricted.

Further, by changing the sound-producing state according to the style state and the sound-producing condition, it is possible to set the optimal sound path for the style without causing discomfort to the user.

Next, an operation of the mobile terminal shown in FIG. 1 is explained with reference to a flowchart shown in FIG. 3.

Figure 3:
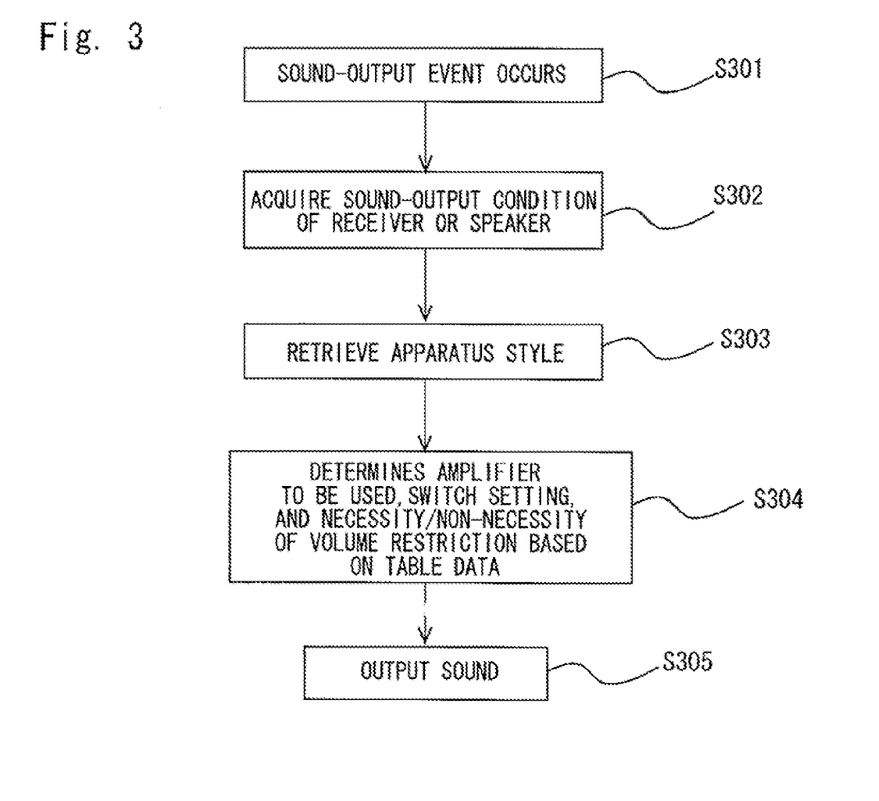
FIG. 3 is an example of a flowchart for explaining an operation of a mobile terminal shown in FIG. 1.
Figure 4A:
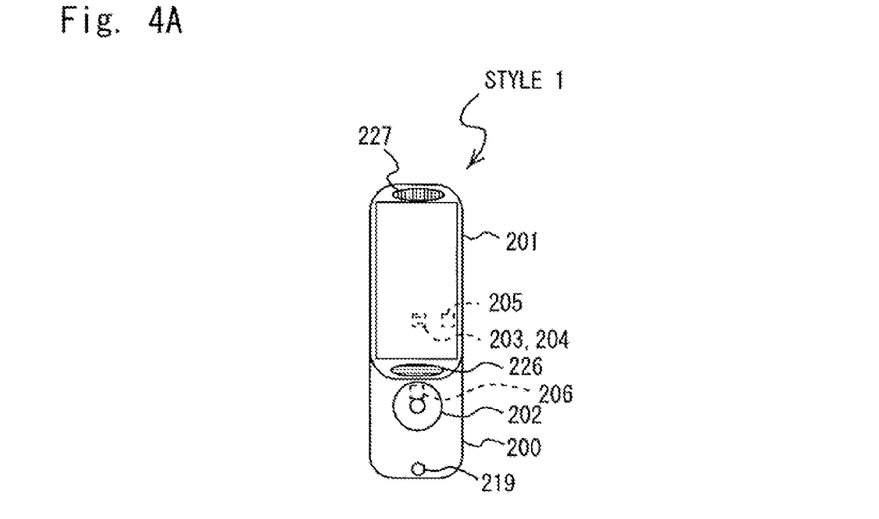
FIG. 4A is an explanatory diagram showing a style of a mobile terminal in accordance with the present invention in which both speaker-and-receiver units 226 and 227 and a microphone 219 are arranged on the same line with the maximum distance therebetween.
Figure 4B:
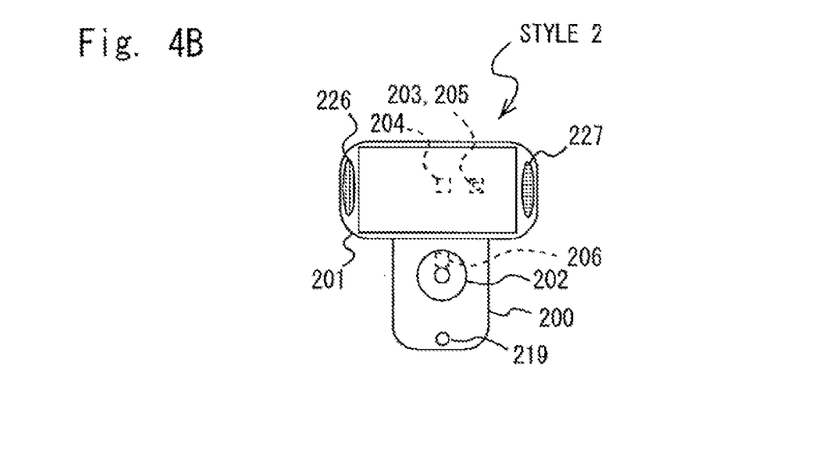
FIG. 4B is an explanatory diagram showing a style of a mobile terminal in accordance with the present invention in which a screen display unit 201 is disposed perpendicularly to a main body 200.
Figure 4C:
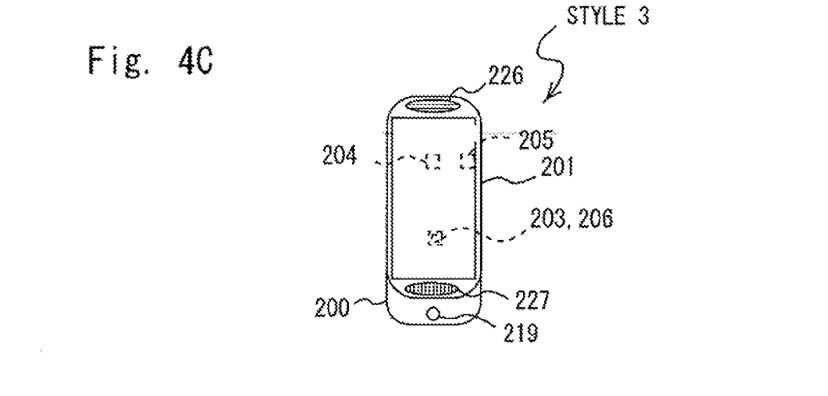
FIG. 4C is an explanatory diagram showing a style of a mobile terminal in accordance with the present invention in which both speaker-and-receiver units 226 and 227 and a microphone 219 are arranged on the same line with the minimum distance therebetween.
Figure 4D:
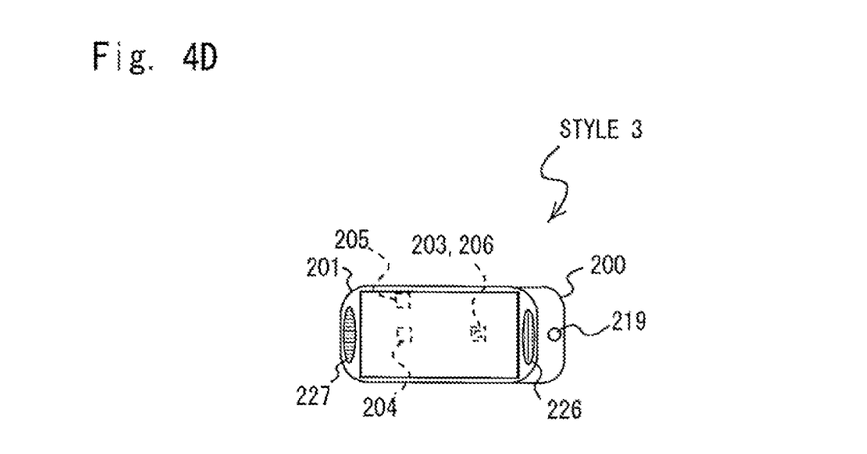
FIG. 4D is an explanatory diagram showing a style of a mobile terminal in accordance with the present invention in which both speaker-and-receiver units 226 and 227 and a microphone 219 are arranged on the same line with the minimum distance therebetween.

FIG. 3 is an example of a flowchart for explaining an operation of the mobile terminal shown in FIG. 1.

In the mobile terminal 10, when a sound-output event occurs (step S301), the processor 211 acquires a sound-output condition of a receiver or a speaker of a speaker-and-receiver unit (step S302), retrieves an apparatus style (step S303), determines an amplifiers) to be used, switch setting, and the necessity/non-necessity of volume restrictions based on table data (step S304), and outputs a sound (step S305).

<Program and Recording Medium>

The mobile terminal in accordance with the present invention explained above may be implemented by using a program that causes a computer to execute processing. Examples of the computer include a general-purpose computer such as a microprocessor. However, the present invention is not limited to this example.

That is, examples of the program include a first program that causes a computer to execute a step of controlling each of speaker-and-receiver units according to a style formed by a screen display unit and a main body, the main body including a microphone, the screen display unit including the speaker-and-receiver units at both ends thereof, and the screen display unit being disposed in the main body in such a manner that the screen display unit, can slide and rotate with respect to the main body.

Further, in addition to the first program, the examples also include a second program that causes a computer, in the step of controlling each of speaker-and-receiver units, to switch a connection between first, second, and third amplification units and either of the speaker-and-receiver units according to the style formed by the screen display unit and the main body, the first and second amplification units being configured to amplify a broadcast signal or a recorded sound signal, and the third amplification unit being configured to amplify a telephone call signal.

Further, in addition to the second program, the examples also include a program that, in the step of controlling each of speaker-and-receiver units, during a voice telephone call, causes a computer to:

if the style formed by the screen display unit and the main body is a style in which both the speaker-and-receiver units and the microphone are arranged on the same line with a maximum distance therebetween, switch the connection so that a speaker-and-receiver unit farther from the microphone is operated as a receiver and put the first and second amplification units into a non-operated state so that another speaker-and-receiver unit is turned off;

if the style formed by the screen display unit and the main body is a style in which the screen display unit is disposed perpendicularly to the main body, put the third amplification unit and the microphone into a non-operated state; and if the style formed by the screen display unit and the main body is a style in which both the speaker-and-receiver units and the microphone are arranged on the same line with a minimum distance therebetween, switch the connection so that a speaker-and-receiver unit farther from the microphone is operated as a receiver and put the first and second amplification units into a non-operated state so that another speaker-and-receiver unit is turned off.

Further, in addition to the second program, the examples also include a program that, in the step of controlling each of speaker-and-receiver units, while receiving a broadcast signal or playing back a recorded signal, causes a computer to, in a case of a style in which both the speaker-and-receiver units and the microphone are arranged on the same line with a maximum distance therebetween, a style in which the screen display unit is disposed perpendicularly to the main body, and a style in which both the speaker-and-receiver units and the microphone are arranged on the same line with a minimum distance therebetween, switch the connection so that both the speaker-and-receiver units are operated as speakers, put the first and second amplification units into operation, and put the third amplification unit into a non-operated state.

Further, in addition to the second program, the examples also include a program that, in the step of controlling each of speaker-and-receiver units, when a ringtone is ringing, causes a computer to in a case of a style in which both the speaker-and-receiver units and the microphone are arranged on the same line with a maximum distance therebetween and a style in which both the speaker-and-receiver units and the microphone are arranged on the same line with a minimum distance therebetween, put a speaker-and-receiver unit closer to the microphone into operation, switch the connection so that another speaker-and-receiver unit is turned off, put the first and second amplification units into a non-operated state, and adjust an output of the third amplification unit to or below a predetermined value.

FIG. 5 is another example of a flowchart for explaining an operation of a mobile terminal in accordance with the present invention.

The processor 211 determines whether the mobile terminal is engaged in a telephone call or not as an occurrence of a sound-output event (step S101).

If the processor 211 determines that the mobile terminal is engaged in a telephone call (step S101/Yes), it determines whether the style of the mobile terminal 10 is Style 1 or not (step S102).

If the processor 211 determines that the style of the mobile terminal 10 is Style 1 (step S102/yes), it switches the switches 224 and 225 so that the Rch-side speaker-and-receiver unit 227, which is farther from the microphone 219, is operated as a receiver and puts the amplifiers 216 and 217 into a non-operated state so that the Lch-side speaker-and-receiver unit 226 is turned off (step S103). In this case, the Rch-side speaker-and-receiver unit 227 is operated with a volume equal to or lower than the maximum permissible volume as a receiver.

In the step S102, if the processor 211 determines that the style of the mobile terminal 10 is not Style 1 (step S102/No), it determines whether the style of the mobile terminal 10 is Style 2 or not (step S104).

If the processor 211 determines that the style of the mobile terminal 10 is Style 2 (step S104, Yes), it does not support the telephone call (non-support) and puts the amplifier 218 into a non-operated state (step S105).

If the processor 211 determines that the style of the mobile terminal 10 is not Style 2 (step S104/No), it switches the switches 224 and 225 so that the Lch-side speaker-and-receiver unit 226 is operated as a receiver and puts the amplifiers 216 and 217 into a non-operated state so that the Rch-side speaker-and-receiver unit 227 is turned off (step S107). In this case, the Lch-side speaker-and-receiver unit 226 is operated with a volume equal to or lower than the maximum permissible volume as a receiver.

In the step S101, if the processor 211 determines that the mobile terminal is not engaged in any telephone call (step S101/No), it determines whether or not the mobile terminal is receiving a broadcast signal or playing back a recorded signal (step S107).

If the processor 211 determines that the mobile terminal is receiving a broadcast signal or playing back a recorded signal (step S107/Yes), it operates both the Lch-side speaker-and-receiver unit 226 and Rch-side speaker-and-receiver unit 227 with a volume larger than a predetermined value (e.g., volume 2). That is, the processor 211 operates both the speaker-and-receiver units 226 and 227 as speakers (step S108).

If the processor 211 determines that the mobile terminal is neither receiving a broadcast signal nor playing back a recorded signal (step S107/No), it determines whether a ringtone is ringing or not (step S109).

If the processor 211 determines that a ringtone is ringing (step S109/Yes), it determines whether the style of the mobile terminal 10 is Style 1 or not (step S110).

If the processor 211 determines that the style of the mobile terminal 10 is Style 1 (step S110/Yes), it operates the Lch-side speaker-and-receiver unit 226 with a volume equal to or lower than a predetermined value (e.g., volume 2) and turns off the Rch-side speaker-and-receiver unit 227. That is, the processor 211 operates the Lch-side speaker-and-receiver unit 226 as a speaker (step S111).

In the step S110, if the processor 211 determines that the style of the mobile terminal 10 is not Style 1 (step S110/No), it operates the Rch-side speaker-and-receiver unit 227 with a volume equal to or lower than a predetermined value (e.g., volume 2) and turns off the Lch-side speaker-and-receiver unit 226. That is, the processor 211 operates the Rch-side speaker-and-receiver unit 227 as a speaker (step S112).

In the step S109, if the processor 211 determines that it is not in such a state that a ringtone is ringing immediately after the start of a telephone call (step S109/No), the process returns to the step S101.

After the step S103, S105, S106, S108, S111 or S112 has finished, the process returns to the step S101.

A mobile terminal in accordance with the present invention can be implemented in any places, provided that it is in a computer environment capable of executing the above-described program.

The program like this may be recorded in a computer readable recording medium.

Note that examples of the recording medium include a computer readable recording medium such as a CD-ROM (Compact Disc Read Only Memory), a flexible disk (FD), and a CD-R (CD Recordable), and a semiconductor memory such as a flash memory, a RAM (Random Access Memory), a ROM (Read Only Memory), and a FeRAM (ferroelectric memory).

Explanation of Advantageous Effects

As has been explained so far, the exemplary embodiment provides the following advantageous effects.

As a first advantageous effect, it is possible to prevent a user from recognizing a wrong speaker-and-receiver unit as the receiver because it is put into an unusable state in advance in styles where there is a possibility that such a mistake could otherwise occur.

As a second advantageous effect, immediately after a sound is produced from a receiver, the volume of a speaker that is not used as the receiver, in addition to the receiver, is also restricted, so that it is possible to alleviate the discomfort to the user that would be otherwise caused when a loud sound is produced while the user is holding the mobile terminal near his/her ear.

Note that the above-described exemplary embodiments are merely examples of preferably exemplary embodiments in accordance with the present invention. The present invention is not limited to these exemplary embodiments, and various modifications can be made without departing from the spirit of the present invention. For example, although an example where a permanent magnet and Hall elements are used to detect the style is explained in the above explanation, the present invention is not limited to this example. For example, a micro switch(es), or a permanent magnet(s) and a lead switch(es) can be also used.

Note that the present invention is not limited to the above-described exemplary embodiments, and various modifications can be made without departing from the spirit of the present invention.

REFERENCE SIGNS LIST

10 MOBILE TERMINAL
210 RADIO UNIT
211 PROCESSOR
212 A/D CONVERSION UNIT
213 to 215 D/A CONVERSION UNIT
216 to 218 AMPLIFIER
219 MICROPHONE
220 Style-1 DETECTION CIRCUIT
221 Style-2 DETECTION CIRCUIT
222 Style-3 DETECTION CIRCUIT
223 STYLE DETECTION CIRCUIT
224, 225 SWITCH
226 Lch-SIDE SPEAKER-AND-RECEIVER UNIT
227 Rch-SIDE SPEAKER-AND-RECEIVER UNIT
228 ANTENNA

The invention claimed is:

1. A mobile terminal comprising:
a main body comprising a microphone;
a screen display unit comprising speaker-and-receiver units at both ends thereof, the screen display unit being disposed in the main body in such a manner that the screen display unit can slide and rotate with respect to the main body;
a control unit that controls each of the speaker-and-receiver units according to a style formed by the screen display unit and the main body;
a style detection unit that detects a style formed by the screen display unit and the main body;
a first and second amplification units that amplify a broadcast signal or a recorded sound signal;
a third amplification unit that amplifies a telephone call signal; and
a switch unit that switches a connection between the first, second, and third amplification units and either of the speaker-and-receiver units according to the style based on an instruction from the control unit,
wherein during a voice telephone call,
in a case of a style in which both the speaker-and-receiver units and the microphone are arranged on the same line with a maximum distance therebetween, the control unit switches the switch unit so that a speaker-and-receiver unit farther from the microphone is operated as a receiver and puts the first and second amplifier units into a non-operated state so that another speaker-and-receiver unit is turned off,
in a case of a style in which the screen display unit is disposed perpendicularly to the main body, the control unit puts the third amplifier unit and the microphone into a non-operated state, and
in a case of a style in which both the speaker-and-receiver units and the microphone are arranged on the same line with a minimum distance therebetween, the control unit switches the switch unit so that a speaker-and-receiver unit farther from the microphone is operated as a receiver and puts the first and second amplifier units into a non-operated state so that another speaker-and-receiver unit is turned off.

2. A mobile terminal comprising:
a main body comprising a microphone;
a screen display unit comprising speaker-and-receiver units at both ends thereof, the screen display unit being disposed in the main body in such a manner that the screen display unit can slide and rotate with respect to the main body;
a control unit that controls each of the speaker-and-receiver units according to a style formed by the screen display unit and the main body;
a style detection unit that detects a style formed by the screen display unit and the main body;
a first and second amplification units that amplify a broadcast signal or a recorded sound signal;
a third amplification unit that amplifies a telephone call signal; and
a switch unit that switches a connection between the first, second, and third amplification units and either of the speaker-and-receiver units according to the style based on an instruction from the control unit,
wherein while receiving a broadcast signal or playing back a recorded signal, in a case of any one of a style in which both the speaker-and-receiver units and the microphone are arranged on the same line with a maximum distance therebetween, a style in which the screen display unit is disposed perpendicularly to the main body, and a style in which both the speaker-and-receiver units and the microphone are arranged on the same line with a minimum distance therebetween, the control unit switches the switch unit so that both the speaker-and-receiver units are operated as speakers, puts the first and second amplifier units into operation, and puts the third amplification unit into a non-operated state.

3. A mobile terminal comprising:
a main body comprising a microphone;
a screen display unit comprising speaker-and-receiver units at both ends thereof, the screen display unit being disposed in the main body in such a manner that the screen display unit can slide and rotate with respect to the main body;
a control unit that controls each of the speaker-and-receiver units according to a style formed by the screen display unit and the main body;
a style detection unit that detects a style formed by the screen display unit and the main body;
a first and second amplification units that amplify a broadcast signal or a recorded sound signal;
a third amplification unit that amplifies a telephone call signal; and
a switch unit that switches a connection between the first, second, and third amplification units and either of the speaker-and-receiver units according to the style based on an instruction from the control unit,
wherein when a ringtone is ringing, in a case of either of a style in which both the speaker-and-receiver units and the microphone are arranged on the same line with a maximum distance therebetween and a style in which both the speaker-and-receiver units and the microphone are arranged on the same line with a minimum distance therebetween, the control unit operates a speaker-and-receiver unit closer to the microphone as a speaker, switches the switch unit so that another speaker-and-receiver unit is turned off, puts the first and second amplifier units into a non-operated state, and adjusts an output of the third amplifier unit to or below a predetermined value.

4. A method of controlling a mobile terminal comprising a main body comprising a microphone, and a screen display unit comprising speaker-and-receiver units at both ends thereof, the screen display unit being disposed in the main body in such a manner that the screen display unit can slide and rotate with respect to the main body, the control method comprising:
controlling each of the speaker-and-receiver units according to a style formed by the screen display unit and the main body;
detecting a style formed by the screen display unit and the main body; and
switching a connection between a first, second, and third amplification units and either of the speaker-and-receiver units according to the style, the first and second amplification units being configured to amplify a broadcast signal or a recorded sound signal, and the third amplification unit being configured to amplify a telephone call signal,
wherein during a voice telephone call,
in a case of a style in which both the speaker-and-receiver units and the microphone are arranged on the same line with a maximum distance therebetween, a speaker-and-receiver unit farther from the microphone is operated as a receiver and another speaker-and-receiver unit is turned off, in a case of a style in which the screen display unit is disposed perpendicularly to the main body, the third amplification unit and the microphone are put into a non-operated state, and in a case of a style in which both the speaker-and-receiver units and the microphone are arranged on the same line with a minimum distance therebetween, a speaker-and-receiver unit farther from the microphone is operated as a receiver and another speaker-and-receiver unit is turned off.

5. A method of controlling a mobile terminal comprising a main body comprising a microphone, and a screen display unit comprising speaker-and-receiver units at both ends thereof, the screen display unit being disposed in the main body in such a manner that the screen display unit can slide and rotate with respect to the main body, the control method comprising:

controlling each of the speaker-and-receiver units according to a style formed by the screen display unit and the main body;

detecting a style formed by the screen display unit and the main body; and switching a connection between a first, second, and third amplification units and either of the speaker-and-receiver units according to the style, the first and second amplification units being configured to amplify a broadcast signal or a recorded sound signal, and the third amplification unit being configured to amplify a telephone call signal, wherein while receiving a broadcast signal or playing back a recorded sound signal, in a case of any one of a style in which both the speaker-and-receiver units and the microphone are arranged on the same line with a maximum distance therebetween, a style in which the screen display unit is disposed perpendicularly to the main body, and a style in which both the speaker-and-receiver units and the microphone are arranged on the same line with a minimum distance therebetween: both the speaker-and-receiver units are operated as speakers; the first and second amplifier units are put into operation; and the third amplification unit is put into a non-operated state.

6. A method of controlling a mobile terminal comprising a main body comprising a microphone, and a screen display unit comprising speaker-and-receiver units at both ends thereof, the screen display unit being disposed in the main body in such a manner that the screen display unit can slide and rotate with respect to the main body, the control method comprising:

controlling each of the speaker-and-receiver units according to a style formed by the screen display unit and the main body;

detecting a style formed by the screen display unit and the main body; and switching a connection between a first, second, and third amplification units and either of the speaker-and-receiver units according to the style, the first and second amplification units being configured to amplify a broadcast signal or a recorded sound signal, and the third amplification unit being configured to amplify a telephone call signal, wherein when a ringtone is ringing, in a case of either of a style in which both the speaker-and-receiver units and the microphone are arranged on the same line with a maximum distance therebetween and a style in which both the speaker-and-receiver units and the microphone are arranged on the same line with a minimum distance therebetween: a speaker-and-receiver unit closer to the microphone is operated as a speaker; another speaker-and-receiver unit is turned off; the first and second amplifier units are put into a non-operated state; and an output of the third amplifier unit is adjusted to or below a predetermined value.

7. A non-transitory computer-readable storage medium storing a program that causes a computer to execute a step of controlling each of speaker-and-receiver units according to a style formed by a screen display unit and a main body, the main body comprising a microphone, the screen display unit comprising the speaker-and-receiver units at both ends thereof, and the screen display unit being disposed in the main body in such a manner that the screen display unit can slide and rotate with respect to the main body, wherein in the step of controlling each of speaker-and-receiver units, during a voice telephone call, the program causes the computer to:

if the style formed by the screen display unit and the main body is a style in which both the speaker-and-receiver units and the microphone are arranged on the same line with a maximum distance therebetween, switch the connection so that a speaker-and-receiver unit farther from the microphone is operated as a receiver and put the first and second amplifier units into a non-operated state so that another speaker-and-receiver unit is turned off;

if the style formed by the screen display unit and the main body is a style in which the screen display unit is disposed perpendicularly to the main body, put the third amplifier unit and the microphone into a non-operated state; and if the style formed by the screen display unit and the main body is a style in which both the speaker-and-receiver units and the microphone are arranged on the same line with a minimum distance therebetween, switch the connection so that a speaker-and-receiver unit farther from the microphone is operated as a receiver and put the first and second amplifier units into a non-operated state so that another speaker-and-receiver unit is turned off.

8. A non-transitory computer-readable storage medium storing a program that causes a computer to execute a step of controlling each of speaker-and-receiver units according to a style formed by a screen display unit and a main body, the main body comprising a microphone, the screen display unit comprising the speaker-and-receiver units at both ends thereof, and the screen display unit being disposed in the main body in such a manner that the screen display unit can slide and rotate with respect to the main body, wherein in the step of controlling each of speaker-and-receiver units, while receiving a broadcast signal or playing back a recorded sound signal, the program causes the computer to:

in a case of a style in which both the speaker-and-receiver units and the microphone are arranged on the same line with a maximum distance therebetween, a style in which the screen display unit is disposed perpendicularly to the main body, and a style in which both the speaker-and-receiver units and the microphone are arranged on the same line with a minimum distance therebetween, switch the connection so that both the speaker-and-receiver units are operated as speakers, put the first and second amplifier units into operation, and put the third amplification unit into a non-operated state.

9. A non-transitory computer-readable storage medium storing a program that causes a computer to execute a step of controlling each of speaker-and-receiver units according to a style formed by a screen display unit and a main body, the main body comprising a microphone, the screen display unit comprising the speaker-and-receiver units at both ends thereof, and the screen display unit being disposed in the main body in such a manner that the screen display unit can slide and rotate with respect to the main body,
   wherein in the step of controlling each of speaker-and-receiver units, when a ringtone is ringing, the program causes the computer to:
in a case of a style in which both the speaker-and-receiver units and the microphone are arranged on the same line with a maximum distance therebetween and a style in which both the speaker-and-receiver units and the microphone are arranged on the same line with a minimum distance therebetween, operates a speaker-and-receiver unit closer to the microphone as a speaker, switch the connection so that another speaker-and-receiver unit is turned off, put the first and second amplifier units into a non-operated state, and adjusts an output of the third amplifier unit to or below a predetermined value.

* * * * *